March 22, 1960  R. K. HODKIN  2,929,260
POWER TRANSMISSION MEANS AND MEANS FOR
EFFECTING CHANGE OF RATIO
Filed June 16, 1958  2 Sheets-Sheet 1

INVENTOR
Richard Keith Hodkin
by
ATTORNEYS

March 22, 1960

R. K. HODKIN 2,929,260

POWER TRANSMISSION MEANS AND MEANS FOR
EFFECTING CHANGE OF RATIO

Filed June 16, 1958

United States Patent Office 2,929,260
Patented Mar. 22, 1960

2,929,260

POWER TRANSMISSION MEANS AND MEANS FOR EFFECTING CHANGE OF RATIO

Richard Keith Hodkin, Dunstable, England, assignor to Engineering Research & Application Limited, Dunstable, England Application June 16, 1958, Serial No. 742,139

Claims priority, application Great Britain June 18, 1957

4 Claims. (Cl. 74—473)

This invention relates to power transmission means and in particular to means for effecting change of ratio. Commonly, gear change is effected by means of a gear changing lever operating in an H gate having a fifth leg for reverse. The main object of the present invention is to provide means of simple construction for operating a gear change lever or like member.

A further object of the invention is to provide gear ratio control means in which a pair of cam plates can control the movements of a ratio selecting member for obtaining any required number of gear changes and which lends itself to easy automatic control by means of an electric device for alternately locking the plates.

Another object of the invention is to enable such a pair of cam plates to be connected together in such manner that an operation controlled by one cam plate for selecting one gear ratio simultaneously moves the other cam plate into position for selecting the next succeeding gear ratio for which purpose at least one of the cam plates will be lockable in at least two selecting positions and the cam plates will be simultaneously engaged by a gear ratio selecting member.

According to the invention we provide a pair of cam plates mounted slidably in planes that are parallel to each other and slidable in the same sliding direction, a cam surface in each plate, said surfaces extending in the direction transverse to said sliding direction, said surfaces also being offset to each other in said sliding direction, a plurality of gear ratio control members, a gear change member engageable with said gear ratio control members respectively, said gear change member engaging both cam surfaces simultaneously, said member being urged alternately backwards and forwards in the direction transverse to said sliding direction, means for locking the plates alternately against sliding and for locking at least one plate in at least two positions offset from each other in said sliding direction, whereby the cam surface of the locked plate guides the gear change member into engagement with the required gear ratio control member and at the same time moves the other plate to the next position in which it may be locked and whereby at least one cam plate serves for selection of two gear ratio control members in each of two positions.

The gear ratio control members may be ratio selector members or actually gear ratio changing members.

The invention will now be described by way of example with reference to the accompanying diagrammatic drawings wherein.

Figure 1:
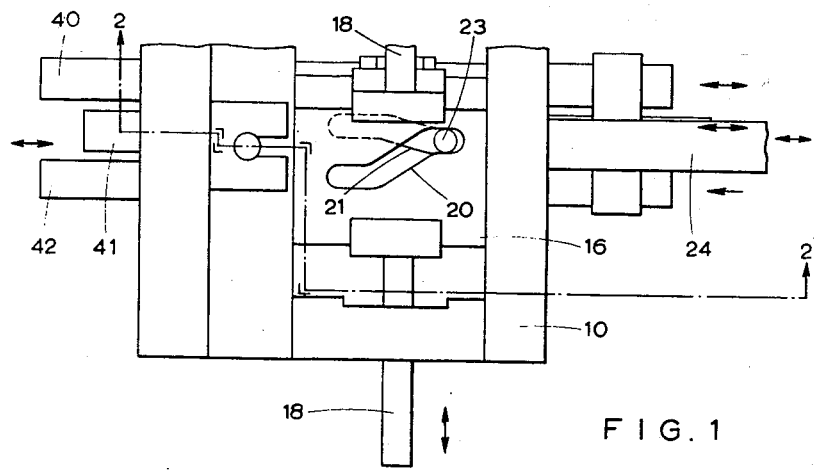
Figure 1 is a plan view of a gear changing device made in accordance with the invention.
Figure 2:
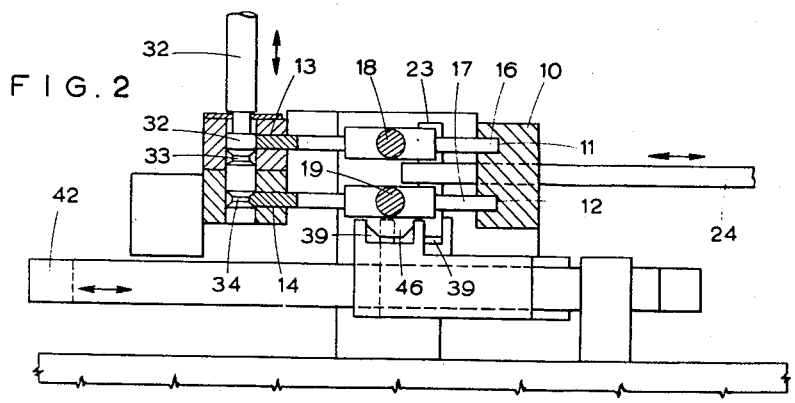
Figure 2 is a sectional view on the line 2—2 on Figure 1.
Figure 3:
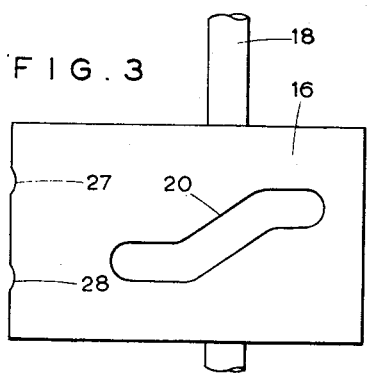
Figure 3 is a plan view of the upper camplate of the device.
Figure 4:
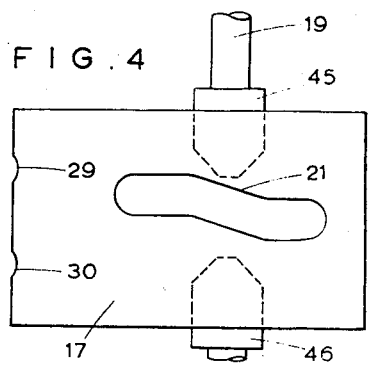
Figure 4 is a plan view of the lower camplate.

A housing 10 has guide grooves 11, 12 on one side and 13, 14 on the other side. An upper camplate 16 slides in the grooves 11, 13 and a lower camplate 17 slides in the grooves 12, 14. The camplates are located in planes parallel to each other and the upper camplate has a cam slot 20 and the lower camplate has a cam slot 21. The upper camplate may also have two guide rods 18, and the lower camplate may have two similar guide rods 19.

Each slot is straight at its ends, the straight parts being parallel to each other and at right angles to the sliding direction of the camplate and being joined by an inclined part, the inclined parts being inclined in opposite ways in the sliding direction. The slots are engaged by a pin 23 common to both slots, this pin being urged for effecting ratio change in the direction of the straight parts for which purpose the pin is connected to an actuator bar 24 that can be moved in opposite directions. Two adjacent straight edges of the plates are provided with recesses 27, 28 and 29, 30 engageable by a locking pin 32 which has two parts 33, 34 of reduced diameter. This pin is movable at right angles to the planes of the plates into two positions. In one position one plate is locked against sliding transversely of said straight parts of the slots by engagement of a full diameter part of the pin in its recess while a reduced diameter part permits sliding of the other plate. In the other position the first plate can slide and the second part is fixed.

The gear change pin 23 engages in one or other of a series of slots 37, 38, 39 in a series of gear change slides or selector rods 40, 41, 42. The slots are open transversely of the direction of movement of the slides which direction is parallel to said straight parts so that as the pin is urged for ratio change the cam slots will cause the pin to move into engagement with the appropriate slide when passing along the inclined part of the cam slots and will move the slide to effect or select gear change as it moves along the straight end part of the cam slots. The camplate nearer to the gear change slides carries a pair of blocks 45, 46 having tapered ends directed towards each other. These bars enter into the slots of said slides and serve to lock the slide bars which are not to be moved to a gear engaging position. The tapered ends will complete the movement of the slides to the locked positions as the plate slides across the slide bars.

All gear changes are made sequentially in the order Reverse, first, second, third, fourth or any part of this series or in reverse order.

Figure 5:
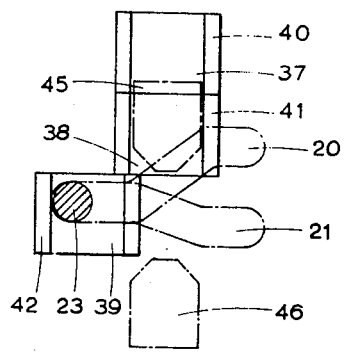
Figures 5 to 9 are plan illustrations of the different positions of the moving parts.
Figure 6:
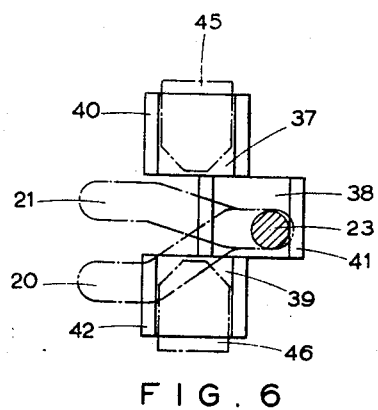
Figure 7:
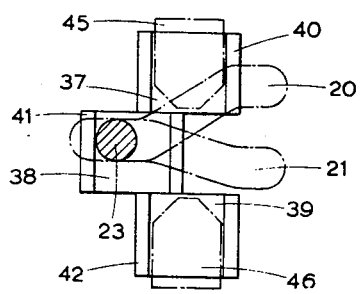
Figure 8:
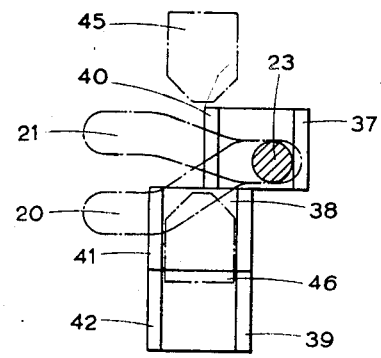
Figure 9:
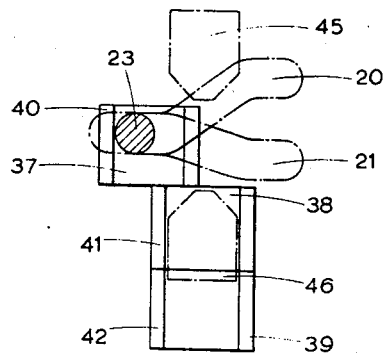

Naming the right hand ends of the cam slots R and the left hand ends L:

If reverse is engaged as shown in Figure 5 and a change to first ratio is required, the pin 32 is moved to a position in which the plate 16 is locked and plate 17 is freed. The gear change pin 23 is driven from L to R and in so doing it moves the reverse slide bar 42 to its disengaged position, moves the first ratio slide bar 41 to its engaged position, and moves plate 17 to its new position. The parts now occupy the positions indicated in Figure 6. If a change to second ratio is now required, plate 17 is locked and plate 16 is freed. The gear change pin 23 is now urged from R to L and in so doing it moves slide bar 41 first to its disengaged position and then to its engaged position and moves plate 16 to a new position. The parts now occupy the positions shown in Figure 7. If third ratio is now required plate 16 is locked in its new position and plate 17 is freed. The gear change pin 23 is now urged from L to R to bring the parts to the positions shown in Figure 8. For top gear plate 17 is locked and plate 16 freed and the gear change pin 23 is again urged from R to L thereby bringing the parts to the positions shown in Figure 9.

The locking pin 32 and the gear change pin 23 may be operated automatically.

I claim:

1. Means for effecting ratio change of a power transmission apparatus comprising a pair of camplates mounted slidably in planes that are parallel to each other and slidable in the same sliding direction, a cam surface in each plate, said surfaces extending in the direction transverse to said sliding direction, said surfaces also being offset to each other in said sliding direction, a plurality of gear ratio control members, a gear change member engageable with said gear ratio control members respectively, said gear change member engaging both cam surfaces simultaneously, said member being urged alternately backwards and forwards in the direction transverse to said sliding direction, means for locking the plates alternately against sliding and for locking at least one plate in at least two positions offset from each other in said sliding direction, whereby the cam surface of the locked plate guides the gear change member into engagement with the required gear ratio control member and at the same time moves the other plate to the next position in which it may be locked and whereby at least one cam plate serves for selection of two gear ratio control members in each of two positions.

2. Means as claimed in claim 1 wherein two adjacent edges of each plate is provided with two recesses engageable by a locking pin which has two parts of reduced diameter, the pin being movable transversely to the plates for locking them alternately against sliding movement and freeing each while locking the other.

3. Means as claimed in claim 1 wherein one plate carries projections engageable in the gear ratio control members to lock those which are not to be moved against movement.

4. Means as claimed in claim 1 wherein the cam surfaces are provided by slots in the plates, each slot having a straight part at each end at right angles to the said sliding direction, said straight parts being connected by an inclined part, said inclined parts being inclined from their adjacent ends in opposite ways in the said sliding direction.

References Cited in the file of this patent

UNITED STATES PATENTS

| | | |
|---|---|---|
| 2,190,629 | Vanderveld | Feb. 13, 1940 |
| 2,193,432 | Randol | Mar. 12, 1940 |
| 2,812,667 | Renaud | Nov. 12, 1957 |